(12) United States Patent
Luxem et al.

(10) Patent No.: US 6,521,905 B1
(45) Date of Patent: Feb. 18, 2003

(54) METHOD AND DEVICE FOR DETECTING THE POSITION OF A TRANSPARENT MOVING CONVEYOR BELT

(75) Inventors: Wolfgang Luxem, Kiel (DE); Karlheinz Peter, Molfsee (DE); Rolf Spitz, Mannheim (DE)

(73) Assignee: NexPress Solutions LLC, Rochester, NY (US)

( * ) Notice: Subject to any disclaimer, the term of this patent is extended or adjusted under 35 U.S.C. 154(b) by 23 days.

(21) Appl. No.: 09/657,896

(22) Filed: Sep. 8, 2000

(30) Foreign Application Priority Data

Sep. 22, 1999 (DE) .......................... 199 45 328

(51) Int. Cl.⁷ .......................... G01N 21/86; G01V 8/00
(52) U.S. Cl. .......................... 250/559.09; 250/559.11; 250/559.36; 250/225; 250/236 R
(58) Field of Search .......................... 250/559.09, 559.11, 250/559.29, 559.36, 559.45, 559.46, 559.48, 225, 223 R; 356/429, 430, 239.1, 614, 615

(56) References Cited

U.S. PATENT DOCUMENTS

| 4,723,072 | A | * | 2/1988 | Naruse | 209/534 |
|---|---|---|---|---|---|
| 4,999,511 | A | * | 3/1991 | Kohno | 250/559.11 |
| 5,013,927 | A | * | 5/1991 | Tsikos et al. | 250/559.08 |
| 5,115,142 | A | * | 5/1992 | Taguchi et al. | 250/548 |
| 5,220,177 | A | * | 6/1993 | Harris | 250/548 |
| 5,598,262 | A | * | 1/1997 | Jutard et al. | 356/239 |
| 5,963,316 | A | * | 10/1999 | Miura et al. | 250/559.09 |
| 6,296,102 | B1 | * | 10/2001 | Uchida et al. | 198/370.07 |
| 6,323,954 | B1 | * | 11/2001 | Halter | 250/559.36 |

FOREIGN PATENT DOCUMENTS

| AT | 001 797 U1 | 11/1997 | .......... G01B/11/04 |
|---|---|---|---|
| DE | 245 252 A1 | 4/1987 | .......... G01B/11/02 |
| DE | 36 42 527 A1 | 6/1989 | .......... G01B/11/04 |
| DE | 38 05 455 C2 | 4/1990 | .......... G01B/11/04 |
| DE | 44 38 014 A1 | 5/1995 | .......... G01B/11/04 |
| DE | 195 19 607 A1 | 12/1996 | .......... B65H/23/032 |
| DE | 296 21 093 U1 | 3/1997 | .......... G01B/11/24 |
| EP | 0 358 331 A2 | 3/1990 | .......... G01B/11/02 |
| EP | 0 903 681 A1 | 3/1999 | .......... G06K/7/00 |
| FR | 2 570 489 | 3/1986 | .......... G01B/11/04 |
| GB | 2 045 920 A | 11/1980 | .......... G01B/11/04 |

* cited by examiner

Primary Examiner—Stephone B. Allen
Assistant Examiner—Bradford Hill
(74) Attorney, Agent, or Firm—Lawrence P. Kessler

(57) ABSTRACT

A method and device for detecting the position of a transparent conveyor belt including directing light beams (2) onto the region of an edge (3) of the conveyor belt, detecting a jump in intensity of the light beam (2, 2') as a consequence of the partial insertion of the conveyor belt into the beam path (2) and evaluating the detected jump in intensity in order to determine the position of the conveyor belt, wherein the light beams (2) are linear polarized light and the beam path (2) is directed at an angle or irradiation (α) between 40° and 80° of the light (2) onto the bounding surface (7) in such a way that a high degree of reflection is achieved and reflected light and non-reflected light is detected.

22 Claims, 3 Drawing Sheets

METHOD AND DEVICE FOR DETECTING THE POSITION OF A TRANSPARENT MOVING CONVEYOR BELT

FIELD OF THE INVENTION

The invention relates to detecting the position of a conveyor belt, light beams being directed onto the region of an edge of the conveyor belt and a jump in intensity of the light beam as a consequence of the partial insertion of the conveyor belt into the beam path being detected and evaluated in order to determine and control the position of the conveyor belt.

BACKGROUND OF THE INVENTION

Methods and devices of the said type are disclosed, for example, in WO 99/00709. In this document, a source for pulsed light or a scanned or pulsed laser beam is arranged on one side of a belt, and a photoreceiver is arranged on the opposite side, in order to detect the position of the belt. Furthermore, this document describes a control system which controls the belt on the basis of detecting its position. In the case of this technical solution, the absorption of the light by the belt is detected and evaluated to determine the position of the belt. However, this functions only when the absorption of the fight beams by the belt is great enough to produce a jump in intensity of the light beam by the insertion of the belt which is clearly delimited and therefore sufficient for detecting the position. This is not ensured in the case of many belts or other materials whose position is to be detected, since these are entirely or partially transparent. For example, belts which transport printing materials for electrophotographic imaging frequently consist of transparent material, since the latter has a multiplicity of properties desired for the said application. However, the position of transparent material also has to be detected and, if appropriate, corrected in other technical fields, for example in the manufacture or further processing of transparent plastic webs, plastic sheets or glasses. In many applications, the arrangement of nontransparent strips on the material is impossible or expensive and frequently unreliable, in particular stuck-on strips can come off.

SUMMARY OF THE INVENTION

The invention is therefore based on the object of the method and the device and control such that the position of transparent material can also be detected with high accuracy. This object is achieved by virtue of the fact that the light beams are polarized light and the beam path is directed against bounding surfaces of the transparent conveyor belt in such a way that at least a partial reflection occurs and the jump in intensity caused thereby is detected. The object is further achieved by virtue of the fact that the light source is a light source for polarized light, that the light source is directed onto bounding surfaces of the transparent conveyor belt in such a way that at least a partial reflection occurs, and that the receiver detects the jump in intensity caused by the reflection, and the evaluation device evaluates the jump in intensity in order to display the position of the conveyor belt. The object is yet further achieved by virtue of the fact that the light source is a light source for polarized light, that the light source is directed onto bounding surfaces of the transparent conveyor belt in such a way that at least a partial reflection occurs, and that the receiver detects the jump in intensity caused by the reflection, and whose position serves the evaluation and control device for the purpose of controlling the position of the conveyor belt.

The advantage of the invention is that a material, which can be sheets or belts, can have its position detected even when it does not have sufficient absorption of light. Since it is also possible to detect other nontransparent materials, the method and the device can be used in a substantially more versatile fashion because one of the specific properties of the conveyor belt material is that a material edge can be detected virtually independently. This results from the fact that use is made only of the reflection properties of the material for polarized light. However, these are a function only of the angle of irradiation and the refractive index of the conveyor belt material. The angle of irradiation required for a reflection can be calculated via the Fresnel formulae. It is essential in this case to select an angle of irradiation for which the fraction of the reflection is so high that a sufficiently high jump in intensity is achieved. This method functions even in the case of a degree of soiling of the conveyor belt material, and in some refinements the jump in intensity is even further increased by soiling. All types of light can be used, that is to say also infrared or ultraviolet.

The jump in intensity can be detected in various ways. The reflected light can be detected, or it is possible to detect the light not reflected by a bounding surface of the conveyor belt material. In both cases, it is the jump in intensity which was caused by the reflection that is detected. Of course, it is also possible to combine the two with one another. The angle of irradiation $\alpha$ of the light onto the bounding surface is expediently selected in such a way that a high degree of reflection is achieved. A possible working range is an angle of irradiation $\alpha$ of between 40 and 80°, the angle of irradiation $\alpha$, however, preferably being at least 60°. In order to achieve a jump in intensity which can be effectively detected, it is proposed to use linearly polarized light. The light is advantageously polarized perpendicular to the plane of incidence, since this is reflected more strongly than light polarized parallel to the plane of incidence.

If the beam is guided such that the jump in intensity is not detected until after a plurality of reflections at the bounding surfaces, a multiplication of the effect and a thus a substantial amplification of the jump in intensity are achieved. Many refinements are possible in order to achieve the above-named effects. The following embodiments serve the purpose of implementing these and further functional principles.

One embodiment provides that the light source and the receiver are arranged on one side of the conveyor belt material. In this case the arrangement of the receiver corresponds to the angle of reflection of the reflected light, in order to receive the latter. Since the beam is reflected both at the conveyor belt material surface, that is to say the interface between air and material, and at the lower a interface between material and air, it is expedient for the receiver to be arranged such that it receives the reflected light beams from both bounding surfaces of the conveyor belt material. In this way, more light is reflected and the jump in intensity is increased. This is independent of whether the receiver detects the reflected light or whether it is arranged such that it detects the light not reflected by bounding surfaces.

One advantageous development provides that a further receiver is arranged on the side of the conveyor belt material opposite the light source in such a way that it receives the light passing through the material. This embodiment has the advantage that it is possible to detect the reflection by one receiver and the transmission by another receiver. In this way, it is also possible to determine soiling of the material and/or the presence of scratches. The advantage of this embodiment is that the position of the edge can also be determined with the aid of the transmission receiver in conjunction with a greatly depressed reflectivity of the material. Furthermore, the detection both of the reflectivity and of the transmission is suitable for the purpose of outputting a corresponding signal in the case of excessively soiled material, in order to be able to eliminate such interference if appropriate.

A further refinement provides that the receiver is arranged on the opposite side of the conveyor belt material for receiving the non-reflected light. In this case, it can detect the jump in intensity by virtue of the fact that it detects both the light passing the edge of the material and the substantially weaker light produced by the reflection and, if appropriate, also an additional absorption. Of course, the jump in intensity can also be detected in the case of total reflection, indeed even more clearly then. This refinement is very insensitive to soiling of the material, since although said soiling possibly reduces the reflectivity of the material, it also simultaneously reduces the transmission, with the result that it is possible, as before, to detect a jump in intensity at the edge of the material. This receiver can also be combined with a receiver for the reflected light.

A further refinement provides that the light source is arranged on one side of the conveyor belt material and a reflector is inserted into the beam path on the other side, a receiver being arranged in such a way that it detects the beam path reflected by the reflector, but does not detect a beam path reflected by a bounding surface. In the case of such a refinement, a substantial increase in the jump in intensity is achieved by virtue of the fact that the receiver is arranged on the same side of the material as the light source and specifically in such a way that the jump in intensity is amplified by two-fold passage of the beam through the material in the region of the edge. This arrangement can be configured in such a way that the light source and the receiver form, with the reflector, a triangle which is produced by the angle of irradiation and angle of reflection of the light at the reflector, or it can be provided that the reflector is arranged in such a way that the beams reflected by it run parallel to the incident beams. In both exemplary embodiments, the beam must pass the bounding surfaces four times, and on each occasion there is a reflection which amplifies the jump in intensity.

A further advantage of this refinement is that the receiver receives both the fraction of the beams which passed the conveyor belt material edge, that is to say have not struck any bounding surface of the material, and the fraction which still passed through the material despite the four-fold reflection. Since both values can be detected, it is also possible to detect soiling of or scratches on the material, since these reduce the reflectivity, and the transmission fraction is thereby increased. Moreover, by using both measured values, it is possible to achieve a correction of the individual values, for example, by averaging and a higher accuracy can be achieved in this way. As a result, in the case of this refinement, it is possible to achieve the same advantages as in the case of the embodiment having two receivers, a reflection receiver and a transmission receiver. In the case of the refinement in which the reflector retroreflects the reflected beams parallel to the incident beams, it is possible that the light source and the receiver form a functional unit. It can then expediently be provided that both are located in one housing. The reflector can be designed in such a way that it rotates the direction of polarization of the light by 90°.

The light source can be, for example, a point light source whose emission characteristic is adapted to the conditions, if appropriate, by arranging suitable optics, for example, stops, upstream. The sensitivity of the measuring method with respect to a change in spacing of a transparent conveyor belt relative to the transmitter and receiver is a function of the type of illumination. However, it is expediently provided that the light source emits parallel light beams, the light beams extending in a region transverse to the conveyor belt edge. Such a parallel beam path has the advantage that fluctuations in the spacing of the material surface from the transmitter and receiver do not feature as errors in the measurement. Of course, it must be ensured that the light images the region of the edge of the material on the receiver. For this purpose, expected fluctuations in the position of the edge are to be included when calculating the dimensions of the region. Another possibility is that the light source emits a scanned beam which sweeps over a region which extends transverse to the edge in such a way that the edge is detected in the case of expected fluctuations in its position. It is also possible in the case of the scanned beam for the latter to be moved in parallel.

The receiver is expediently such that it extends over a region which corresponds to the emitted light beams. A photoreceiver, for example a diode linear array, can be provided as a receiver.

In order to take account of variations, for example soiling of the conveyor belt, a controller can be provided for controlling the intensity of the light beams emitted by the light source, the input variables being the intensities of the received light beams before and after the jump in intensity, and the control aim being the improvement of the jump in intensity. It is possible, furthermore, that the controller activates a display, which produces a signal, when the reflection of the light beams by the material no longer suffices for the exact determination of the position of the edge.

An additional function can be integrated into the device by a planar receiver, as a result of which it is possible to determine an oblique position of the conveyor belt material edge or by detecting the position of the edge at two spaced apart regions and determining an oblique position of the edge therefrom.

An additional function is also possible for the control device by virtue of the fact that at least one receiver determines the data on the oblique position of the edge of the conveyor belt material and feeds them to the control device, the latter being such that it undertakes a correction of the oblique position.

Of course, all functional refinements can be implemented both by the embodiments proposed and by further ones, both in the case of the device and in the case of the control device.

BRIEF DESCRIPTION OF THE DRAWINGS

A few basic possible configurations of the device according to this invention and of the control device are illustrated with the aid of the accompanying drawings, in which.

DETAILED DESCRIPTION OF THE INVENTION

Figure 1:
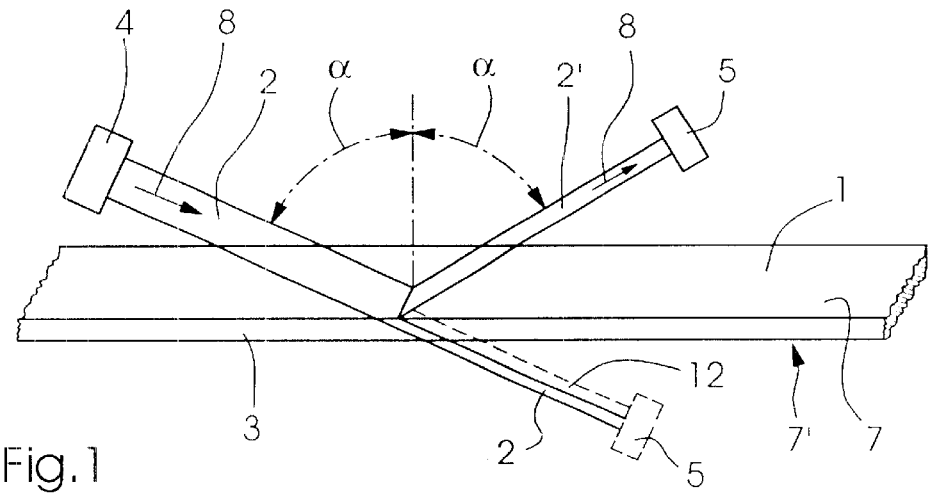
FIG. 1 shows an illustration of two possibilities for implementing the invention.

FIG. 1 shows an illustration of two possibilities for implementing the invention. Fitted above a material 1, for example a transparent conveyor belt, is a light source 4 which directs light beams 2 in the direction of the arrow 8 onto the surface 7 between air and material 1. The light beams are polarized light, and the angle of irradiation α is selected in such a way that the polarized light 2 is reflected totally or very largely at the bounding surface 7. This reflection takes place if the light beams 2 strike the material 1. If the light beams 2 pass the edge 3 of the material 1, these light beams 2 are not reflected. The light beams 2' reflected at the surface 7 are detected by a receiver which is arranged on the same side as the light source 4 and in this way determines a jump in intensity of the light beam 2' where the light beams 2 are no longer reflected, but pass the edge 3 of the material 1. The exact position of the edge 3 of the material 1 can be determined by this jump in intensity.

As an alternative to the reflected light beams 2', it is also possible to determine the fractions of the light beam 2 which have not been reflected by the bounding surface 7. For this purpose, a receiver 5, as illustrated by dashes, is arranged on the side of the material 1 opposite the light source 4. In addition to the non-reflected fraction of the light beams 2, this receiver 5 can also receive light 12 which has passed through the material, as a result of which the jump in intensity is rendered visible. The comparison of the light 12 which has passed through the material 1 with the light 2 which has passed directly to the receiver 5 can additionally serve the purpose of establishing variations in the material 1, for example, soiling. A further advantage consists in that in the case of heavy soiling the absorption of radiation likewise produces a jump in intensity, and consequently a certain degree of reduction in the reflection in the case of a transparent conveyor belt material 1 is compensated by a rise in the absorption. Impairment owing to soiling of a transparent belt is avoided to the greatest possible extent in this way.

Figure 2:
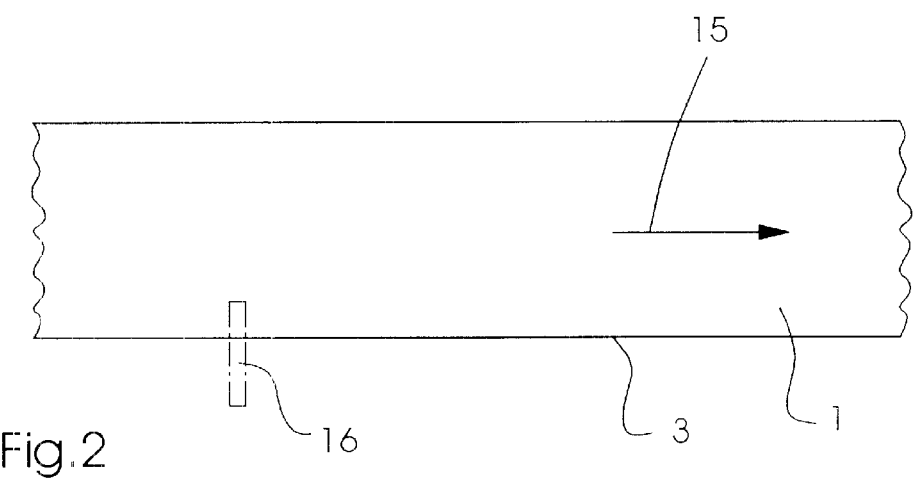
FIG. 2 shows the top view of detecting a belt.

FIG. 2 shows a detection of a belt in top view, the material 1 constructed as a belt being moved on in the direction of the arrow 15 and the edge 3 having to be detected. For this purpose, light beams 2 are directed onto a region 16 which is configured with a size such that the position of the edge 3 can be detected even in the case of maximum fluctuations. This detection of the edge inside the region 16 can be undertaken in the way already illustrated or in a way described further below.

Figure 3:
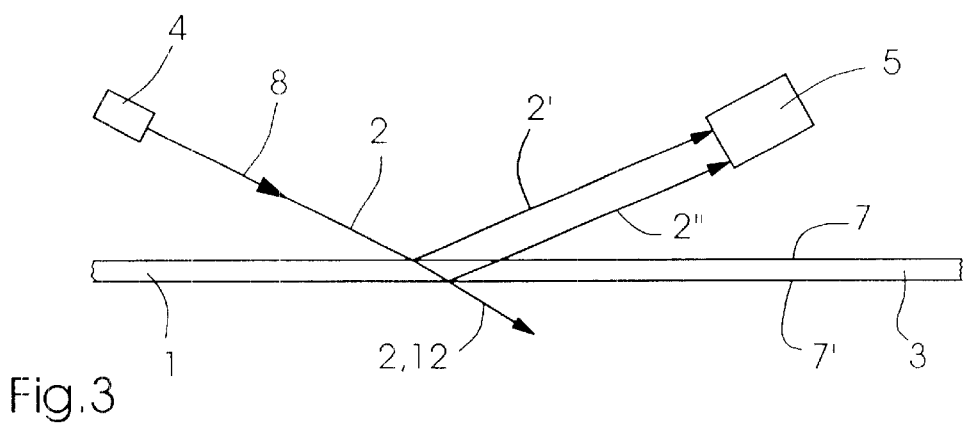
FIG. 3 shows a refinement with detection of two reflections.

FIG. 3 shows a refinement with a detection of two reflections 2' and 2". The polarized light 2 directed by the light source 4 onto the material 1 is reflected not only at the surface, that is to say the interface 7 between air and material 1 but also at the underside, that is to say the interface 7' between material 1 and air. This gives two reflected light beams 2' and 2". This embodiment provides that the receiver 5 is constructed in such a way that it receives both the reflected light beams 2' and 2", thereby resulting in the production of an even clearer jump in intensity. Otherwise, the functional principle is that described in relation to the first alternative in the case of FIG. 1.

Figure 4:
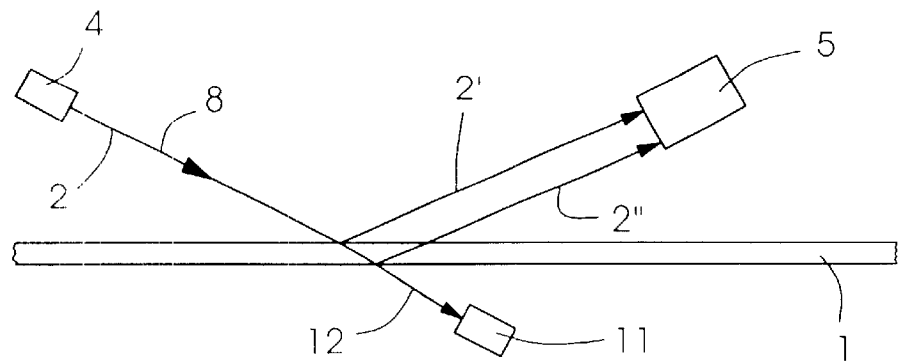
FIG. 4 shows a refinement with an additional receiver.

FIG. 4 shows a refinement with a further receiver 11. The latter has been added to the refinement described in relation to FIG. 3 in order to receive the light 12 passing through the material 1 and the light 2 passing the edge 3, for the purpose of determining the jump in intensity. If the reflectivity of the belt suffices, both receivers 5 and 11 can be used to determine the position of the belt edge 3. The use of both measured values enables a correction of the individual measured value, for example by averaging, and a high accuracy can thereby be achieved. If the reflectivity of the belt 1 drops owing to soiling, and thus also there is a drop in the difference in intensity on the reflection receiver 5, it must be ensured that the determination of the lateral belt edge position 3 is based solely on the transmission receiver, that is to say the further receiver 11. The signal of the receiver 5 or both receivers 5 and 11 can also be used to determine soiling of, or else scratches on, the belt 1.

Figure 5:
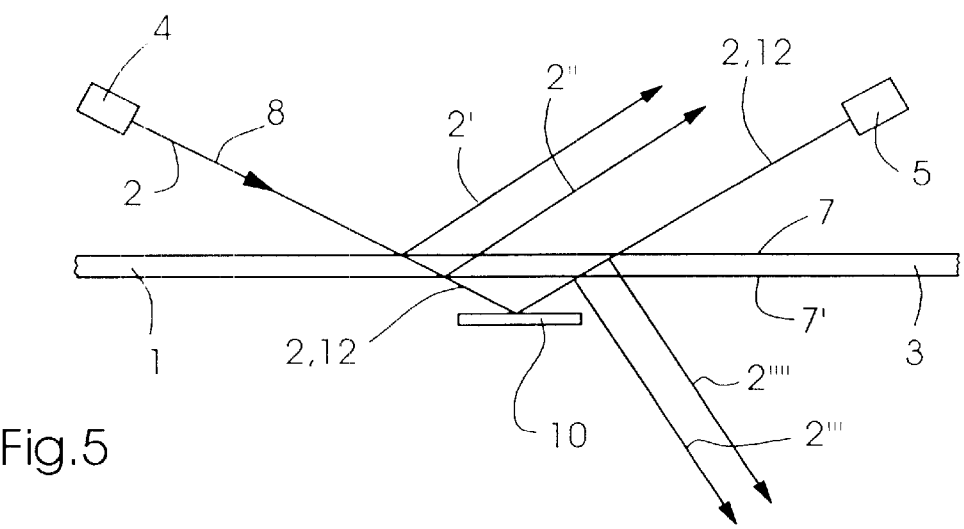
FIG. 5 shows a refinement with a reflector.

FIG. 5 shows a refinement with a reflector 10. The arrangement of the light source 4 and the direction 8 of the beam path 2 corresponds to that as described above, but there is arranged on the opposite side of the material 1 a reflector 10 which reflects the light 2 and 12 and thereby sends it once more in the direction of the material 1. The light 2, 12 reflected by the reflector 10 is received by a receiver 5 which is arranged on the side of the material 1 opposite the reflector 10. In this case a very clear jump in intensity is produced, since the light 2 not passing through the material 1 virtually has full intensity and the light 12 passing through the material 1 is substantially diminished in intensity. It is achieved as a result of this last fact that with reference to the light beam 2 a first reflection 2' takes place when the bounding surface 7 is struck and thereafter a second reflection 2" takes place at the bounding surface 7'. After reflection by the reflector 10, a third reflection 2'" is produced at the bounding surface 7', and a fourth reflection 2"" is again produced when the bounding surface 7 is struck. Consequently, virtually no more of the beams 12 which pass through the material 1 arrive at the receiver 5 and a clear jump in intensity is thereby produced.

Figure 6:
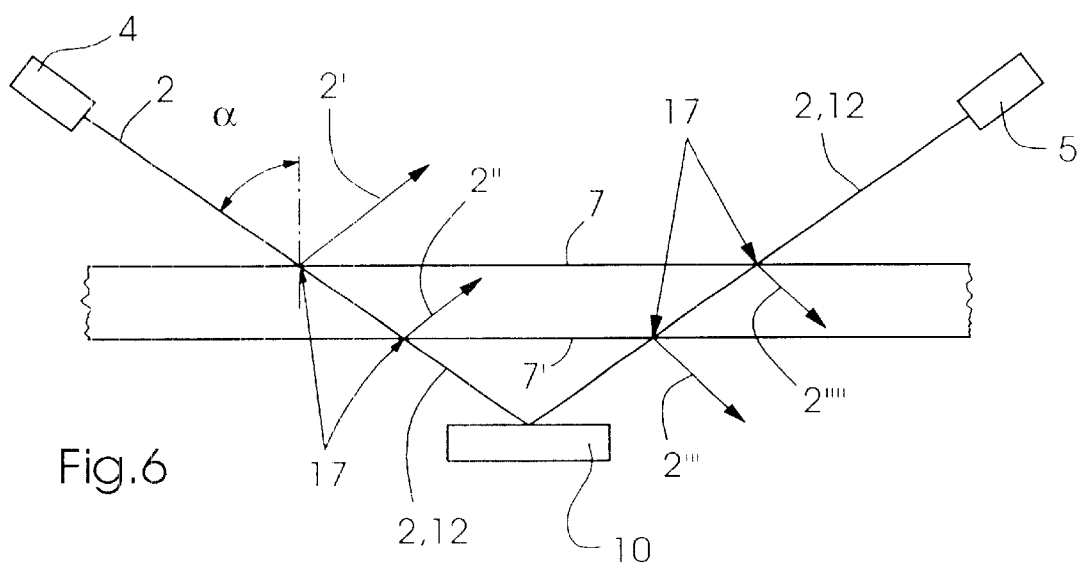
FIG. 6 shows the beam path of the refinement with a reflector.

FIG. 6 shows the beam path 2 in the case of the refinement in accordance with FIG. 5. In addition to what is described with reference to FIG. 5, instances of refraction 17 of the light beam 2 occur at the bounding surfaces 7 and 7'. Since the direction of the beam 2 is changed by these instances of refraction 17, it must already be taken into account when selecting the angle of irradiation a that the angle of irradiation also suffices in the case of the subsequent interfaces 7 and 7', in order to produce the high degree of reflection 2", 2'" and 2"". Moreover, this fact is also to be taken into account in arranging the reflector 10 and the receiver 5.

Figure 7:
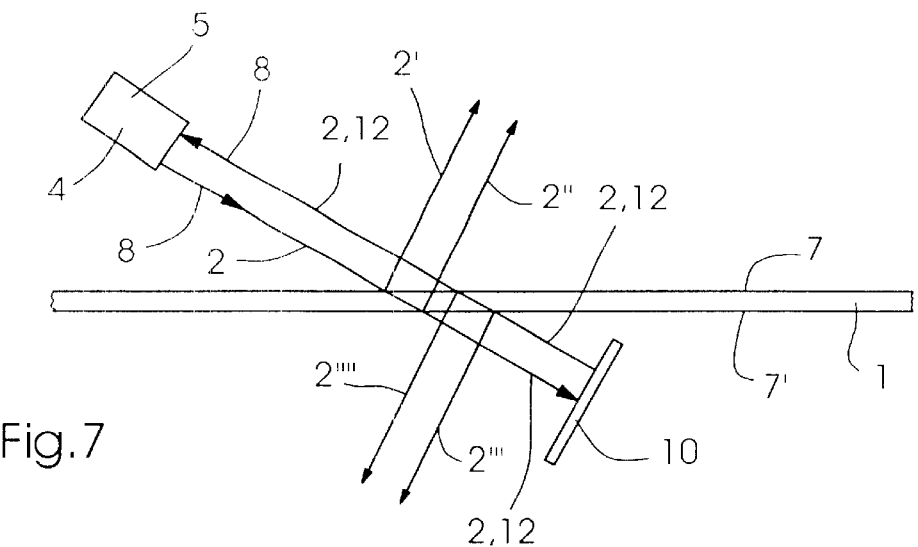
FIG. 7 shows a refinement with a reflection of the beams by a reflector parallel to the incident light.

FIG. 7 shows a refinement with a reflection of the beams 2 and 12 by a reflector 10, which reflects the beams 2, 12 parallel to the incident light 2, 12. For this purpose, the reflector 10 is arranged opposite the light source 4 on the other side of the material 1 and the light beams 2, 12 strike the reflector 10 perpendicularly. As a result, the direction 8 of the reflected beam path is parallel to the direction 8 of the beam path arriving at the reflector 10. The reflections 2', 2", 2'" and 2"" can be produced in this way at four bounding surfaces 7, 7' in a way similar to FIG. 6. In the case of this embodiment as well, a pronounced jump in intensity is obtained in this way. A further advantage of this refinement is that the light source 4 and the receiver 5 can be an integrated component, for example it is possible for them both to be arranged in the same housing. The space requirement in the machine is reduced in this way, and installation is facilitated. Here, as well, the receiver 5 can be designed in such a way that it also receives the fractions of the light 12 passing through the material 1. Soiling of the belt can be determined in this way.

Figure 8:
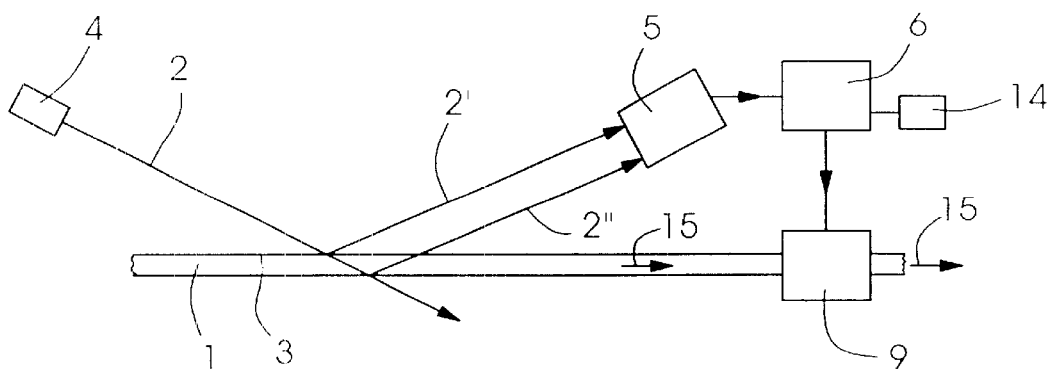
FIG. 8 shows an embodiment with a control device.

FIG. 8 shows an embodiment with a control device for controlling the position of the material 1. The material 1 is a transparent conveyor belt which moves in the direction of the arrow 15. The device configured in accordance with FIG. 3 is used to examine the position of the edge 3 of the belt material 1; the receiver 5 passes said position to an evaluation device 6 which compares the actual position with the desired position and passes on signals for correcting the position of the belt to a control device 9 which, acting as a belt control, controls the position of the edge 3 in such a way that said position is returned to its desired position in the event of deviations. Of course, the device for detecting the position of the edge 3 can be configured as desired, all the embodiments illustrated being possible. It is also possible to detect sheets or another configuration of material 1 instead of a belt. In accordance with the configuration of the material 1, the control device 9 must be a belt edge controller or a controller for the alignment of sheets or other material 1.

Figure 9:
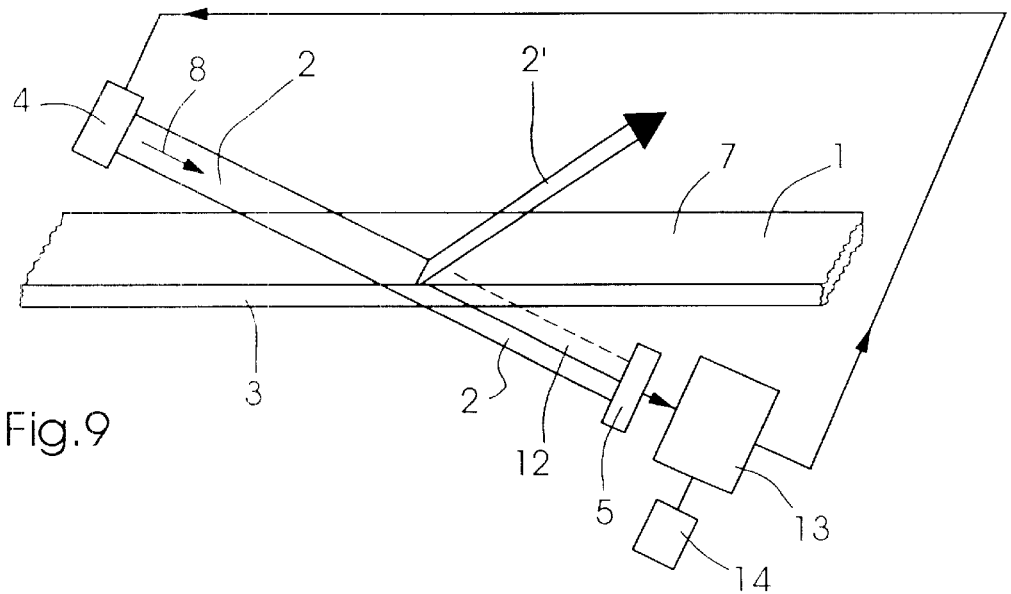
FIG. 9 shows an embodiment with control of the light source.

FIG. 9 shows an embodiment with a control of the light source 4. For such a control, it is possible, for example, to detect the fraction of the light beams 2 which arrive directly at the receiver 5, and the portions of the light 12 passing through the material 1. If the deviations occur in this case, for example by virtue of the fact that the light 12 passing through the material 1 becomes, for example, stronger because of increasing reflectivity, or becomes weaker because of increasing absorption, this indicates that the belt 1 is soiled. In order, nevertheless, to achieve an adequate jump in intensity, the values are fed to a controller 13 which, for example, amplifies the light of the light source 4, weakens it or undertakes other controls for the purpose of improving the jump in intensity. Of course, a receiver 5 or 11, or an evaluation device 6 can also be readjusted with this aim. However, instead of the light 12 passing through the material 1, for the purpose of such control it is also possible to detect the light 2' reflected at the boundary surface 7, and to use a reduction in the reflection 2' to control the light source 4 by the controller 13. If the soiling of the material 1 is too severe, a display device 14 can output a visual or acoustic signal which indicates that the interference must be eliminated.

The illustations and descriptions are merely exemplary. The method according to the invention, and the device according to the invention can, of course, also be used for nontransparent material 1, since the likewise reflects light beams. It is also possible in the case of narrow belts to use the light beams to detect the region of the entire belt, that is to say the two edges 3. In order to detect the position of sheet-shaped material, in addition to determining the outer edges 3 in the transparent direction 15 the method according to the invention can also determine the position of the front edge or the rear edge, in order thus to ensure these sheets are fed exactly to a device for further processing at a specific instant. Furthermore, the display device 14 can be equipped such that it displays the position of an edge 3, the degree of soiling or other parameters, or output signals such as a warning, when the jump in intensity can no longer be determined, the edge 3 to be determined is no longer situated in the detection region, or another interference has arisen.

The invention has been described in detail with particular reference to certain preferred embodiments thereof, but it will be understood that variations and modifications can be effected within the spirit and scope of the invention.

List of Reference Symbols
1 conveyor belt material
2, 2', 2", 2 "', 2"" light beams/beam path
2 light emitted and/or not reflected by a bounding surface of the material
2' first reflection of the light beam
2" second reflection
2"' third reflection
2"" fourth reflection
3 edge of the conveyor belt material
4 light source
5 receiver (reflection receiver)
6 evaluation device
7, 7' bounding surfaces of the conveyor belt material
7 air/material interface (in the direction of the beam path)
7' material/air interface (in the direction of the beam path)
8 arrow: direction of the beam path
9 control device
10 reflector
11 further receiver (transmission receiver)
12 light passing through the conveyor belt material
13 controller
14 display device
15 arrow: running direction of the conveyor belt
16 region which is detected by the measurement
17 refraction of the light beam
α angles of irradiation and emersion

We claim:

1. A method for detecting the position of a transparent conveyor belt comprising: directing light beams (2) onto the region of an edge (3) of the conveyor belt, detecting a jump in intensity of the light beam (2, 2') as a consequence of the partial insertion of the conveyor belt into the beam path (2) and evaluating the detected jump in intensity in order to determine the position of the conveyor belt, wherein the light beams (2) are linearly polarized light and the beam path (2) is directed at an angle or irradiation (α) between 40° and 80° of the light (2) onto the bounding surface (7) of said conveyor belt in such a way that a high degree of reflection is achieved and reflected light and non-reflected light is detected.

2. The method as claimed in claim 1, wherein the angle of irradiation (α) is at least 60°.

3. The method as claimed in claim 1, wherein light polarized perpendicular to the plane of incidence is used.

4. The method as claimed in claim 1, wherein the beam (2) is guided such that the jump in intensity is not detected until after a plurality of reflections (2', 2", 2", 2") at the bounding surfaces (7, 7').

5. A device for detecting the position of a moving transparent conveyor belt, comprising: a light source (4), a receiver (5) and an evaluation device (6), wherein the light source is linearly polarized light (2) at an angle or irradiation (α) between 40° and 80° of the light (2) onto the bounding surface (7) in such a way that a high degree of reflection is achieved, wherein the light source is directed onto bounding surfaces (7, 7') of said conveyor belt in such a way that at least a partial reflection at an angle of reflection (α) (2', 2", 2", 2") occurs, wherein the receiver (5) detects the jump in intensity caused by the reflection (2', 2", 2", 2"") and by the non-reflection, and wherein the evaluation device (6) evaluates the jump in intensity in order to display the position of the conveyor belt.

6. The device as claimed in claim 5, wherein the light source (4) and the receiver (5), the latter located in accordance with the angle of reflection (α) of the reflected light (2'), are arranged on one side of the conveyor belt.

7. The device as claimed in claim 5, wherein the receiver (5) receives the reflected light beams (2', 2") from both bounding surfaces (7, 7') of the conveyor belt.

8. The device as claimed in claim 6, wherein a further receiver (11) is arranged on the side of the conveyor belt opposite the light source in such a way that it receives the light (12) passing through the conveyor belt.

9. The device as claimed in claim 5, wherein the receiver (5) is arranged on the opposite side of the conveyor belt for receiving the non-reflected light (2).

10. The device as claimed in claim 5, where in the light source (4) is arranged on one side of the material (1) and a reflector (10) inserted into the beam path (2) on the other side, a receiver (5) being arranged in such a way that it detects the beam path (2) reflected by the reflector (10), but does not detect a beam path (2', 2", 2''', 2'''') reflected by a bounding surface (7, 7').

11. The device as claimed in claim 10, wherein the receiver (5) is arranged on the same side of the material (1) as the light source (4) in such a way that the jump in intensity is amplified by two-fold passage of the beam (2) through the region (16) of the edge (3) of the conveyor belt.

12. The device as claimed in claim 11, wherein the light source (4) and the receiver (5) form with the reflector (10) a triangle which is produced by the angle of irradiation and angle of reflection (α) of the light (2) at the reflector (10).

13. The device as claimed in claim 11, wherein the reflector (10) is arranged in such a way that the beams (2) reflected by it run parallel to the incident beams (2).

14. The device as claimed in claim 10, wherein the reflector (10) rotates the direction of polarization of the light (2) by 90°.

15. The device as claimed in claim 5, wherein the light source (4) emits parallel light beams (2), the light beams (2) extending transverse to the edge (3) of the conveyor belt in such a way that they cover a region (16) of expected fluctuations in the position of the edge (3) of the conveyor belt.

16. The device as claimed in claim 5, wherein the light source (4) emits a scanned beam (2) which sweeps over a region (16) which extends transverse to the edge (3) of the conveyor belt in such a way that the edge (3) is detected in the case of expected fluctuations in its position.

17. The device as claimed in claim 5, further including a controller (13) for controlling the intensity of the light beams (2) emitted by the light source (4), the input variables to the controller being the intensities of the received light beams (2) before and after the jump in intensity, and the control aim of the controller being the improvement of the jump in intensity.

18. The device as claimed in claim 17, wherein the controller (13) activates a display (14) when the reflection (2', 2", 2''', 2'''') of the light beams (2) by the conveyor belt no longer suffices for the exact determination of the position of the edge (3) of the conveyor belt.

19. The device as claimed in claim 18, wherein the receiver (5) is of planar design and thereby determines an oblique position of the edge (3) of the conveyor belt.

20. The device as claimed in claim 18, wherein the position of the edge (3) of the conveyor belt is detected at two spaced apart regions (16), and an oblique position of the edge (3) of the conveyor belt is determined therefrom.

21. A control device for a moving a transparent conveyor belt, having a light source (4) which applies a light beam (2) to the region (16) of an edge (3) of the moving conveyor belt, a receiver (5) which detects a jump in intensity of the light beam (2) as a consequence of the partial insertion of the conveyor belt into the beam path (2, 2', 2"), and an evaluation and control device (6, 9) which controls the conveyor belt with reference to its position, wherein the light source is a light source (4) for polarized light (2), wherein the light source (4) is directed onto bounding surfaces (7, 7') of the conveyor belt in such a way that at least a partial reflection (2', 2", 2''', 2'''') occurs, and wherein the receiver (5) detects the jump in intensity caused by the reflection (2', 2", 2", 2") and the non-reflection, and whose position serves the evaluation and control device (6, 9) for the purpose of controlling the position of the conveyor belt.

22. The control device as claimed in claim 21, wherein at least one receiver (5) determines the data on the oblique position of the edge (3) of the conveyor belt and feeds them to the control device (9) such that it undertakes a correction of the oblique position.

* * * * *